INVENTORS
EDGAR T. GORMAN
DONALD D. NELSON
BY Kinney, Alexander,
Sell, Steldt & De La Hunt
ATTORNEYS United States Patent Office 3,497,710
Patented Feb. 24, 1970

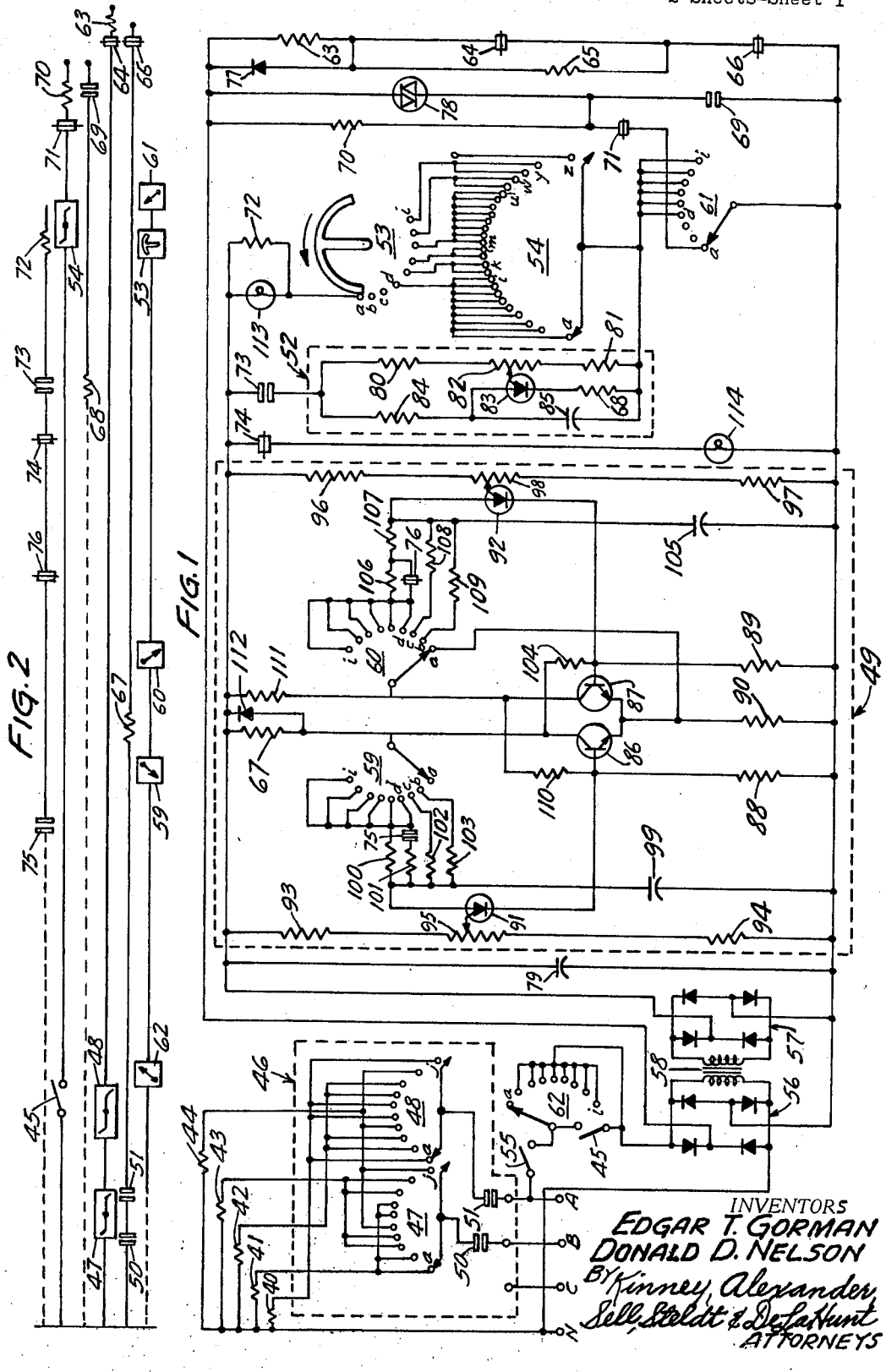

3,497,710
ELECTRICAL ENERGY DISTRIBUTION
CONTROL SYSTEM
Edgar T. Gorman, White Bear Township, Ramsey County,
and Donald D. Nelson, Bloomington, Minn., assignors
to Minnesota Mining and Manufacturing Company, St.
Paul, Minn., a corporation of Delaware
Filed Sept. 26, 1968, Ser. No. 762,911
Int. Cl. H02j *1/00, 3/00, 3/14*
U.S. Cl. 307—41                                                              14 Claims

ABSTRACT OF THE DISCLOSURE

A system for controlling distribution of electrical energy from a power source to a load in predetermined series of intermittent on and off intervals for a prescribed period is shown. The system includes a load contact network which predetermines the sequence in which combinations of loads are energized by the power source; a recycle timer circuit which predetermines the duration of each switching interval for changing the combination of loads, and the duration of intervals for energization of loads between switching intervals; a means for selecting combinations of switching and energization intervals in accordance with selected first and second modes of distribution; means for prescribing the period of operation in accordance with a first mode of distribution; a counter for counting the duration over which the loads are energized in accordance with a first mode of distribution; and means responsive to the counter counting for the prescribed duration for changing the energization and switching intervals of the recycle timer circuit from those corresponding with a first mode of distribution to those corresponding with a second mode.

---

This invention relates to a system for controlling the distribution of electric energy.

A system capable of controlling the distribution of a predetermined quantity of electric energy in predetermined series of intermittent pulses is provided. This system is capable of switching from a mode for controlled distribution of electric energy in predetermined series of intermittent intervals over a prescribed period to a mode for controlled distribution of electric energy in intermittent intervals over an indeterminate period. Distribution control is achieved notwithstanding temporary interruption of the power at the source. This system is programmable to optimize this type of distribution consistent with the power available notwithstanding variations in the number of loads to be energized or the particular energy requirements of the various loads.

An exemplary use of the distribution control system of this invention is with a pulse cooking and heating system wherein, it is desirable to furnish a predetermined quantity of heat to each of a plurality of resistively heated food containers in predetermined series of intermittent on and off intervals over a prescribed cooking period. In practice, it is desirable to provide energy to the plurality of loads in such manner that for all of the loads each receives essentially the quantity of energy individually required over the prescribed cooking period and that the number of loads provided with energy at any given time be predetermined in order to optimize the power available. The quantity of heat furnished to a load in energization pulses over the prescribed period is approximately equal to $V^2T/R$ where V is the average voltage across the load, R is the average resistance of the load during the prescribed period and T is the sum of the energization pulse intervals.

By varying the intervals during which energy is distributed and by providing for sequentially switching energy distribution between various combinations of selected loads, the aforementioned features deemed desirable for the pulse cooking and heating system are provided by the present invention. This control system is capable of distributing electric energy provided from either single phase or poly-phase sources.

In a system designed to control distribution of a predetermined quantity of electric energy, it is also desirable to provide for the eventuality of power distribution interruption by forces outside of the control system. The control system should, in such an eventuality, in effect remember how much energy has already been furnished and upon resumption of power provide only so much more energy as is needed to complete the predetermined quantity of energy distribution. The control system of this invention provides this capability.

In using the pulse cooking and heating system, it is also desirable to be able to keep the food warm after it has fully cooked. This can be accomplished by providing intermittent pulses of energy to the load over an indeterminate period. The capability of switching from a cooking mode wherein a predetermined quantity of energy is distributed to the load in a predetermined series of intermittent pulses for a prescribed period to an interminable hold or keep warm mode wherein energy is distributed to the load in a predetermined series of intermittent pulses for an interminable period is provided by the electric energy distribution control system of this invention.

Existing systems are capable of providing intermittent electric energy distribution during the duration of a prescribed period. An electric oven with a timer and a thermostat, thermocouple or the like is an example of such an existing system. However, this type of existing system is dependent upon temperature variations for controlling the intervals during which electric energy is distributed, and is not capable of providing a predetermined series of intermittent pulses.

In another existing system, motor driven timers which rotate cams are combined with electromechanical switches such that the cam movements control the actuation of the switches. A seven-day light timer is an example of this type of existing system. This existing system is capable of controlling the distribution of a predetermined quantity of energy in a predetermined series of intermittent pulses. However, it is not programmable to optimize this type of distribution consistent with the the power available notwithstanding variations in the number of loads to be energized or the particular energy requirements of the various loads.

The present invention and the pulse cooking and heating system, which represents one example of the utility of the present invention, are described with reference to the drawing in which:

FIGURE 1 is a schematic diagram of a system for controlling the distribution of electric energy in a predetermined sequence from two phases of a three phase, AC power source to five loads;

FIGURE 2 is a key diagram to show the interconnection of the switching elements of FIGURE 1;

Figure 3:
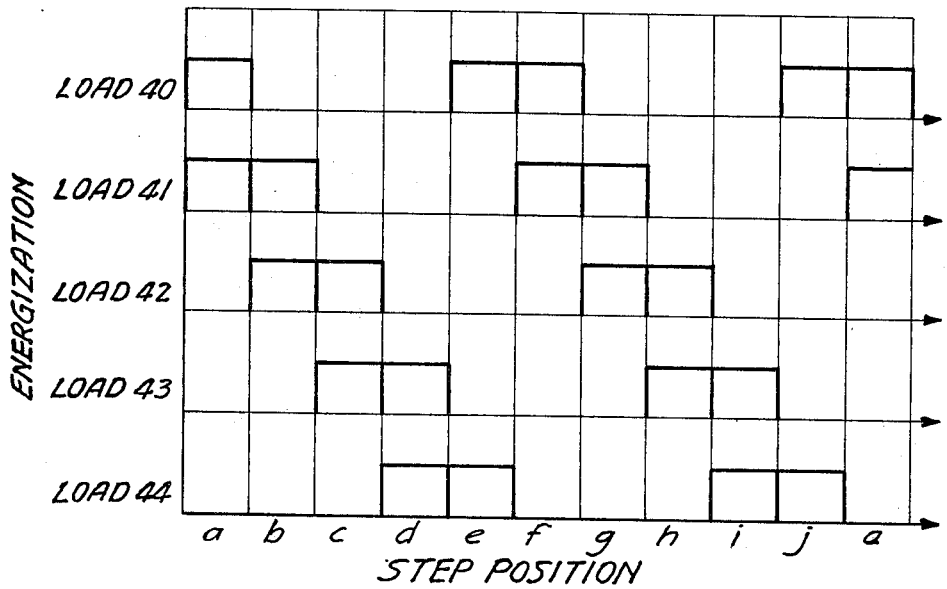
FIGURE 3 shows the energization sequence for the loads energized in accordance with the control system of FIGURE 1.
Figure 4:
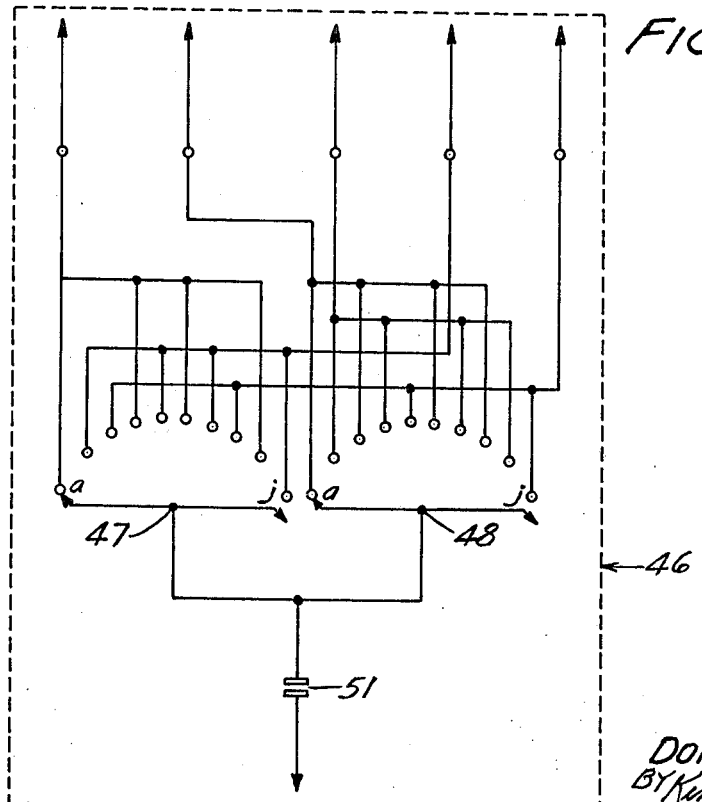
FIGURE 4 is an alternative embodiment of that portion of the control system shown in FIGURE 1 which is used for predetermining the sequence of energy distribution to the loads. The embodiment in FIGURE 4 is for distribution from a single phase source to five loads.

Referring to FIGURE 1, an embodiment of the system for controlling distribution of electric energy is shown energizing five loads 40–44 from a power source, such as two phases of a four-wire three-phase power supply, N, C, B, A. A load contact network 46 is placed between the source and the loads to program the energy distribution essentially equally among the loads over a prescribed period. The loads are connected to various terminals of a first switching section such as rotary stepping switches 47 and 48. The rotary stepping switches are energized in response to pulses of a recycle timer circuit 49 to step periodically. Stepping switches 47 and 48 move through positions *a* to *j* simultaneously. In this embodiment, connections between loads 40–44 and rotary stepping switches 47 and 48 are programmed to provide current flow to the loads so that only two loads are energized at any one time and so that each load is energized in a sequence of on for two intervals and off for three intervals. This energization sequence is illustrated in FIGURE 3. The load contact network 46 contains a second switching section such as relay contacts 50 and 51 on the input lines from the source. The position of the relay contacts 50 and 51 are also controlled by the recycle timer circuit 49. The recycle timer 49 causes the relay contacts 50 and 51 to be closed only during the intervals between the periodic steps of the rotary stepping switches 47 and 48. This prevents arcing between the rotary stepping switch contacts while these switches step. The load contact network 46 connections could be readily modified to also accommodate distribution from single or three-phase power supplies. A single phase embodiment is shown in FIGURE 4. The sequence of the intervals is not restricted to two on and three off as illustrated in FIGURE 1 but may be variably selected. An embodiment providing for single step on-intervals and an off-interval varying between one and two steps is shown in FIGURE 4.

The prescribed period over which the loads are to be energized is determined by the component values in the pulse timer circuit 52, the predetermined setting of shorting switch 53 and the interconnection between rotary stepping switch 54 and shorting switch 53. Pulse timer circuit 52 and switch 54 are in effect a counter. The pulse timer circuit 52 controls the rate at which rotary stepping switch 54 rotates. The interconnection between shorting switch 53 and rotary stepping switch 54 determines the number of times the rotary stepping switch 54 will rotate in response to pulses generated by the pulse timing circuit 52. Responsive to the rotary stepping switch 54 completing its predetermined number of steps, the operation of the recycle timer circuit 49 changes and the mode of energy distribution changes. In the embodiment of the control system illustrated in FIGURE 1, the operation of recycle timer 49 changes so as to step rotary stepping switches 47 and 48 less frequently and to close contacts 50 and 51 to allow energization of the loads for an interval which is relatively short both in comparison to the interval between steps and in comparison to the load energization intervals during the first mode of distribution wherein a predetermined quantity of energy is distributed for a prescribed period. The circuit remains in the second mode for distributing less frequent energization until the control system is either turned off or reset to its first mode. The rate of energy distribution to the loads during the second mode can be set to compensate for any energy dissipation from the load following the completion of the first mode of distribution. The second mode connections can also be programmed to place the recycle timer in an interminable switching interval, and thereby in effect turn off distribution of energy to the load. Thus the second mode of distribution can be, in effect, an "off" mode. The embodiment for changing modes of distribution can be used in the pulse cooking and heating system to provide energy pulses to keep the food warm after cooking has been completed.

In the embodiment shown in FIGURE 1, the recycle timer circuit 49 and the counter 52, 54 are energized from the neutral and one phase of the lines leading from the power source to the load. Thus if the power source is temporarily interrupted, the recycle timer circuit 49, the pulse timing circuit 52 and the rotary stepping switch 54 will also be interrupted in their sequence. The rotary stepping switch 54 is capable of resuming operation without having to be reset at the beginning of its sequence and is thus a memory unit which is capable of in effect remembering how much energy has been distributed to the load so as not to provide more than the predetermined quantity, although the prescribed period is temporarily interrupted.

The operation of the control system shown in FIGURE 1 will best be understood by detailed consideration of its various components. Safety interlock switch 55 must be closed to energize the control system. When safety interlock switch 55 is open, relay contacts 50 and 51 receiving no actuation from recycle timer circuit 49 remain open and no current flows to the loads 40–44.

Rectifier bridges 56 and 57 and transformer 58 provide two levels of DC voltage for the control system.

The mode of distribution is selected by positioning the progressive shorting switch 53. Progressive shorting switch 53 is ganged with recycle timer switches 59 and 60, switch 61 and off-on switch 62, so that all five switches move from position *a* through *i* simultaneously.

Rotary stepping switches 47 and 48 step simultaneously when sufficient current flows through coil 63. Normally-closed interrupter contacts 64 open after coil 63 has caused switches 47 and 48 to step. Resistor 65 maintains a lower level of current flow through coil 63 to keep the coil 63 from being overheated. Normally-closed relay contacts 66 open when sufficient current flows through recycle timer coil 67. Sufficient current through recycle timer coil 67 also closes load contact network relay contacts 50 and 51.

Current through pulse timer coil 68 closes normally-open relay contacts 69.

Current through coil 70 steps rotary stepping switch 54 and opens normally-closed interrupter contacts 71. Switch 45 is connected to the rotating mechanism of rotary stepping switch 54. It is opened when rotary stepping switch 54 is in position *a* and is closed when rotary stepping switch 54 is in position *b–z*.

Current through relay coil 72 closes normally-open relay contacts 73 and opens normally-closed relay contacts 74. A recycle timer switching section such as relay contacts 75 and 76 is also responsive to current through relay coil 72. Such current closes the normally open contacts 75 and opens the normally closed contacts 76.

Diode 77 protects relay contacts 66 by dissipating any transient voltage induced in coil 63 when current through coil 63 is interrupted.

Varistor 78 dissipates transient voltages induced in coil 70 when current through coil 70 is interrupted.

Capacitor 79 filters the ripple from the DC voltage supplied from rectifier bridge 57.

In the pulse timer circuit 52, resistors 80 and 81 and potentiometer 82 provide a voltage dividing network for connection to the gate of a programmable unijunction transistor 83. Resistor 84 and capacitor 85 are chosen to predetermine the interval at which the programmable unijunction transistor 83 pulses to deliver current through coil 68.

The pulse timer circuit 52 provides a stepping pulse at predetermined periodic intervals to the rotary stepping switch 54. A stepping switch was chosen for the counter because it would maintain its position in the event of power interruption and because of the ease in changing and selecting different timing intervals.

The recycle timer circuit 49 is required to provide programmable energization and switching interval times for distribution of electric energy to the load. A positive on or off condition is provided by a pair of transistors 86 and 87 connected with positive feed-back to make a bistable circuit. Resistors 88 and 89 provide a biasing voltage on the base of the transistors 86 and 87 respectively. Resistor 90 provides a bias on the common emitter terminals of the transistors 86 and 87. When transistor 86 is turned on, the bias current through resistor 104 is cut off so transistor 87 is cut off, which in turn provides adequate bias current through resistor 110 to maintain the transistor 86 in the full conduction state. Transistor 87 can be made to conduct by application of an external bias current, whereupon the conducting transistor 86 (in the absence of an external signal) will be turned off.

The recycling of the bistable circuit requires momentary external bias currents at a predetermined interval of time to control the continuous on-off cycling. The timing is done by a resistance-capacitance (RC) circuit, and the required pulse of external bias current is derived by the discharge of the capacitor 99 or 105 through a programmable unijunction transistor 91 or 92 into the base of transistor 86 or 87. Programmable unijunction transistors 91 and 92 are connected to alternately deliver pulses to the base terminals of transistors 86 and 87 respectively. Resistors 93 and 94 and potentiometer 95 provide a voltage dividing network for connection to the gate of programmable unijunction transistor 91. Resistors 96 and 97 and potentiometer 98 provide a voltage dividing network for connection to the gate of programmable unijunction transistor 92.

Two RC circuits and programmable unijunction transistors 91 and 92 provide the pulsing to control the recycle timer circuit 49. The timed pulsing of programmable unijunction transistor 91 is initiated when the collector voltage of the transistor 86 rises and provides charging current through the connected timing resistor 100, 101, 102 or 103. When the voltage across the capacitor 99 at the anode of programmable unijunction transistor 91 is about 0.6 volt higher than the voltage of the programmable unijunction transistor 91 gate, the programmable unijunction transistor 91 turns on and effectively connects capacitor 99 to the base of transistor 86 to turn transistor 86 on. The other transistor 87 then is turned off and the timed pulsing of the other programmable unijunction transistor 92 circuit is initiated to turn the transistor 87 back on after a period of time determined by the values of the timing resistor 106, 107, 108 or 109, and capacitor 105 and the voltage level of the programmable unijunction transistor 92 gate. Potentiometers 95 and 98 are used to adjust the gate voltages of programmable unijunction transistors 91 and 92 to compensate for the deviation of the capacitance values of capacitors 99 and 105 from the nominal values.

The different timing resistors 100–103 and 106–109 in the recycle timer circuit 49 allow the operator to choose different switching and energization cycle times which controls the duration and frequency of electrical energy distribution to the load.

With switches 53 and 59–62 in position, a, the control system is off except when the stepping switch 54 is self-stepping to the starting position. Thus the jumper from position a of recycle timer switch 60 to the emitter prevents the transistor circuit from allowing current through relay coil 67. With recycle timer switches 59 and 60 in positions b and c, the timing resistors are chosen for different predetermined energization and switching intervals for the second mode of distribution. In the remaining 6 positions, d–i, the energization and switching cycles are predetermined for a first mode of distribution while relay coil 72 is energized, and for a second mode of distribution when the prescribed period is elapsed and relay coil 72 is not energized. The prescribed period in each of the last six positions, d–i, is different and is controlled by the setting of progressive shorting switch 53.

Resistor 111 is a load resistor for transistor 87 whereas diode 112 protects transistor 86 against transient voltages induced in the recycle timer circuit. Cooking lamp 113 lights while the recycle timer is in its first mode of distribution and ready lamp 114 lights while the circuit is in its second mode of distribution. Used with the pulsed cooking and heating system, light 113 would show that food was cooking and light 114 would show that the food was done.

To place the control system in its first mode of distribution, the progressive shorting switch 53 is selectively rotated to short out contacts a–d. The rotation of progressive shorting switch 53 in turn rotates recycle timer switches 59 and 60, switch 61 and on-off switch 62 to position d. Rotary stepping switch 54 begins in position a. The control system is energized by closing safety interlock switch 55. Assuming transistor 86 first conducts, sufficient current will flow through relay coil 67 to close relay contacts 50 and 51 in order to allow current flow to the loads 40–44. Also, in response to sufficient current through relay coil 67, relay contacts 66 open to terminate current through relay coil 63. Upon transistor 86 being rendered conductive, a current is also conducted through resistor 107 which commences the RC time for building up sufficient potential at the anode of programmable unijunction transistor 92 to discharge capacitor 105 to the base of transistor 87 to turn transistor 87 on and transistor 86 off. When transistor 87 conducts and transistor 86 is nonconductive, the current through coil 67 drops to open relay contacts 50 and 51 in order to prevent current to loads 40–44, and to close relay contacts 66 to allow current through interrupter contacts 64 and coil 63. Initially, current flows through coil 63 at a first level of sufficient magnitude to rotate stepping switches 47 and 48. However, in response to the flow of current through coil 63, interrupter contacts 64 drop open and the flow of current to coil 63 is rerouted through resistor 65 which is of sufficient magnitude to reduce the current through coil 63. The smaller current through coil 63 reduces heat dissipation in coil 63, but yet is sufficient to maintain interrupter contacts 64 in an open position.

Upon the progressive shorting switch 53 and switch 61 being rotated to position d, current flows through coil 72. In response to current flowing through coil 72, relay contacts 73 and 75 are closed and relay contacts 74 and 76 are opened. The closing of contacts 73 allows current to flow through the pulse timer circuit 52 to commence counting the time during which energy is distributed in accordance with the first mode of distribution. In accordance with the selected RC values of the pulse timer circuit, programmable unijunction transistor 83 will deliver a pulse of current periodically through relay coil 68 which flow of current through relay coil 68 closes normally-open relay contact 69 which allows the flow of current through coil 70. Upon current flowing through coil 70, the rotary stepping switch 54 rotates. Thus, for each pulse of the pulse timer circuit 52, rotary stepping switch 54 rotates one position to count another interval of first mode distribution. With progressive shorting switch 53 in position d, upon rotary stepping switch 54 rotating to position j, the flow of current to relay coil 72 through progressive shorting switch 53 is interrupted. Thereupon, relay contacts 73 and 75 will open and relay contacts 74 and 76 will close. The opening of relay contacts 73 ceases the operation of the rotary stepping switch 54. The opening of relay contacts 75 and the closing of relay contacts 76 changes the RC configurations related to transistors 86 and 87 so as to change the timing cycles of recycle timer circuit 49 to be in accordance with a second mode of distribution. Recycle timer circuit 49 will thereafter continue to operate in accordance with this second mode of distribution until the control system is de-energized. In the second mode of distribution just as in the first, the flow of sufficient current through coil 67 closes load contact network relays 50 and 51 and opens relay contacts 66 to terminate flow of current through coil 63. Upon current flow through coil 63 ceasing, the interrupter contacts 64 will again close.

The recycle timer circuit 49 operates in accordance with the so-called second mode of distribution initially if the progressive shorting switch 53 is selectively positioned in either position *b* or *c* which positioning will also cause recycle timer switches 59 and 60, switch 61 and on-off switch 62 to be positioned in position *b* or *c*. The total duration for the first mode of distribution can be prescribed by positioning the progressive shorting switch in positions *d–i*.

Upon completion of the prescribed period for the first mode of distribution, rotary stepping switch 54 stops short of position *a*. To reset rotary stepping switch 54, shorting switch 53 is positioned in position *a*. This rotation causes the associated switches 59 through 62 to also be positioned in position *a*. With recycle timer switches 59 and 60 in position *a*, recycle timer circuit 49 does not function to close load network contacts 50 and 51, hence no power can be delivered to the load and no current can pass through relay coil 72. Thus, the pulse timer circuit 52 cannot function. However, current does pass through interrupter contacts 71 and coil 70. Although switch 62 is open, switch 45 is closed since rotary stepping switch 54 is in a position other than position *a* and a voltage is therefore available across coil 70. Current is allowed to flow through a switching circuit comprising switch contact 61a, interrupter contact 71 and coil 70. The flow of current through coil 70 rotates rotary stepping switch 54 one position and opens interrupter contacts 71. Upon interrupter contacts 71 being opened, current flow through coil 70 ceases and interrupter contacts 71 again close to allow current to again flow through coil 70 to step rotary stepping switch 54 an additional position. However, upon rotary stepping switch 54 reaching position *a*, switch 45 opens and the control system is de-energized thereby preventing further rotation of stepping switch 54.

This control system can used with the pulse cooking and heating system. In one embodiment, power is provided from a three phase, four wire, 400 Hz., 200 v. AC supply through the load contact network 46 to five resistively heated casseroles. The power drawn from one phase and neutral and fed to the control circuit is rectified by bridge 56 to supply 115 v. DC. Bridge 57 receives power from step-down transformer 58. The output of bridge 57 supplies approximately 28 v. DC power and is filtered by capacitor 79 to reduced ripple. The total cooking time was selected by positioning progressive shorting switch 53 to short out through from 4 to 9 of positions *a–j* of rotary stepping switch 54, the shortest cooking duration being when only positions *a–d* were shorted out and the longest cooking duration being when positions *a–j* were shorted out. Indicator light 113 is on while cooking is in progress. Upon completion of the prescribed cooking interval, the recycle timer of the control system operates in accordance with the second mode of distribution to provide only sufficient energy to keep the casseroles warm until they are removed from the oven. Also, upon the prescribed intervals being completed, cooking lamp 113 goes out and ready light 114 comes on.

With the embodiment shown in FIGURE 1, energy was supplied in the pulse sequences shown in FIGURE 3, so that each casserole was heated for approximately 20 seconds and then not heated for approximately 30 seconds. The total cooking time ranged from 9 minutes with progressive shorting switch 53 in position *d* to 25 minutes with progressive shorting switch 53 in position *i*. Positions *b* and *c* provide different modes of distribution for keeping food warm, the difference being that energy is delivered to any load for approximately 1½ seconds each 63¾ seconds for position *b* and for 2½ seconds each 67½ seconds for position *c*. The stepping switches 47 and 48 step once per 12¾ seconds in position *b* and once per 13½ seconds in position *c*. For position *b* of recycle timer circuit switches 59 and 60, the energization and switching intervals are predetermined to be ¾ and 12 seconds respectively. For position *c*, they are predetermined to be 1¼ and 12 seconds respectively. In positions *d* through *i*, they are 10 and ½ seconds respectively during the first mode of distribution and are 1 and 12 seconds respectively during the second mode of distribution following the opening of contacts 75 and the closing of contacts 76. The pulse timer circuit 52 delivers current pulses approximately once per minute.

In this specific embodiment, components of the following value or manufacture were used:

Resistors:
| | |
|---|---|
| 65 | 500Ω. |
| 80 | 10 KΩ. |
| 81 | 27 KΩ. |
| 82 | 25 KΩ. |
| 84 | 1.3 MΩ. |
| 88, 89 | 8.2 KΩ. |
| 90 | 27Ω. |
| 93, 96 | 15 KΩ. |
| 94, 97 | 39 KΩ. |
| 95, 98 | 25 KΩ. |
| 100, 102, 103 | 560 KΩ. |
| 101 | 22 KΩ. |
| 104, 110 | 3.9 KΩ. |
| 106 | 470 KΩ. |
| 107 | 47 KΩ. |
| 108 | 82 KΩ. |
| 109 | 39 KΩ. |
| 111 | 300Ω. |

Capacitors:
| | |
|---|---|
| 79 | 4700 µf. |
| 85 | 47 µf. |
| 99, 105 | 22 µf. |

Transistors:
| | |
|---|---|
| 83, 91, 92 | Programmable unijunction transistor type D13T2 manufactured by the General Electric Company of Syracuse, N.Y. |
| 86, 87 | PNP transistor type 2N3404 manufactured by the General Electric Company of Syracuse, N.Y. |

| | |
|---|---|
| Diodes of rectifier bridge 56, diode 77 | Rated at 2A/400PIV. |
| Diodes of rectifier bridge 57, diode 112 | Rated at 2A/100PIV. |
| Transformer 58 | Rated at 115/18 v. single phase 60/400 Hz., 20 VA. |
| Recycle timer relay represented by coil 67, contacts 50, 51, 66 | Relay, Model 110–4442 manufactured by the Ward Leonard Company of Mount Vernon, N.Y. |
| Stepping switch represented by coil 63, stepping switches 47, 48, contacts 64 | Stepping Switch Model 250–384–046 manufactured by the Ledex Company of Dayton, Ohio. |
| Relay represented by coil 68, contacts 69 | Relay Model W102RMPCX–3 manufactured by the Magnecraft Company of Chicago, Ill. |

| | |
|---|---|
| Stepping switch represented by coil 70, switch 45, contacts 71, rotary stepping switch 54 containing varistor 78 | Stepping Switch Model RM–95V manufactured by the Automatic Electric Company of Northlake, Ill. |
| Relay represented by coil 72, contacts 73, 74, 75, 76 | Relay Model CR120G20303 manufactured by the General Electric Company of Syracuse, N.Y. |
| Switch assembly containing switches 53, 59, 60, 61, 62 | Switch Assembly manufactured by Centralab, Division of Globe Union of Milwaukee, Wis., Model PA–301 shaft and a Model PA–12 progressive shorting section for switch 53, three Model PA–0 sections for switches 59, 60 and 61 and one model PA–1 section for switch 62. |

What is claimed is:

1. A system for controlling distribution of electrical energy from a power source to a load in predetermined series of intermittent on and off intervals for a prescribed period comprising
   means for connecting the load to the source in accordance with either of at least two modes of distribution for a predetermined series of intermittent on-intervals, said on-interval series being interspaced by a predetermined series of intermittent off-intervals, the connecting means including
      programming means for predetermining the duration of on-intervals and the duration of off-intervals during a first mode of distribution, and
      programming means for predetermining the duration of on-intervals and the duration of off-intervals during a second mode of distribution;
   means for selecting the mode of distribution;
   means for prescribing the period over which the load is energized in accordance with the first mode of distribution;
   counting means operatively coupled to the mode selecting means to operate when the first mode of distribution is selected for counting the time over which electrical energy is distributed to the load in accordance with the fist mode of distribution; and
   changing means operatively coupled to the counting means, the programming means and the connecting means, the changing means being responsive to the counting means having operated for the prescribed period to change the connecting means from the first mode of distribution to the second mode of distribution.

2. The electrical energy distribution control system of claim 1 for producing distribution to a plurality of loads wherein the connecting means further includes
   means for switching through a sequence of connections between the power source and predetermined combinations of the loads;
   means operatively coupled to the switching means for preventing distribution of energy to the loads during the switching intervals in which the switching means function, the periods between switching intervals being energization intervals, the on-intervals being at least one energization interval and the off-intervals being at least one energization interval; and
   means operatively coupled to the switching means for predetermining the combination of loads for connection to the power source during each energization interval and for selecting the sequence in which the combinations of loads are energized consistent with the power available and the predetermined series of on and off intervals for the various selected loads.

3. The electrical energy distribution control system of claim 1 wherein the counting means includes
   a pulse timer circuit which is programmed to deliver current pulses at predetermined periodic intervals; and
   a stepping switch operatively coupled to the pulse timing circuit to step one position in response to each current pulse delivered by the pulse timer circuit.

4. The electrical energy distribution control system of claim 3 wherein the prescribing means includes
   a switch connected to the stepping switch for prescribing the stepping switch position at which the current through the stepping switch is changed.

5. The electrical energy distribution control system of claim 2 wherein
   a recycle timer circuit, having a bistable circuit with two alternative states which includes a switching means having two alternative conditions connected in the bistable circuit to change its condition each time the bistable circuit changes its state, is programmed to cause the bistable circuit to conduct in one state for a duration corresponding to the switching interval and to conduct in its other state for a duration corresponding to the energization interval;
   means connecting between the source and the load and operatively coupled to the bistable circuit switching means to allow distribution of energy to the loads when the bistable circuit conducts in the energization interval and to prevent distribution of energy to the loads when the bistable circuit conducts in the switching interval; and
   means operatively coupled to the bistable circuit switching means and to the sequential switching means for actuating the sequential switching means when the bistable circuit conducts in the switching interval.

6. The electrical energy distribution control system of claim 5 wherein the recycle timer circuit has
   programming means for predetermining switching and energization intervals corresponding to the first mode of distribution and for predetermining switching and energization intervals corresponding to the second mode of distribution; and
   means connected to the recycle timer programming means and the bistable circuit for switching the bistable circuit from states corresponding to the first mode of distribution to a state corresponding to the second mode of distribution.

7. The electrical energy distribution control system of claim 6 wherein
   the counting means includes
      a pulse timer circuit which is programmed to deliver current pulses at predetermined periodic intervals, and
      a stepping switch operatively coupled to the pulse timer circuit to step one position in response to each current pulse delivered by the pulse timer circuit;
   the prescribing means includes
      a switch connected to the stepping switch for prescribing a stepping switch position at which the current through the stepping switch is changed; and
   the changing means are operatively coupled to the stepping switch and to the recycle timer circuit switching means to actuate the recycle timer circuit switching means in response to the stepping switch assuming the position at which the current through the stepping switch is changed.

8. A system for controlling distribution of electrical energy from a power source to a load in predetermined series of intermittent on and off intervals for a prescribed period, comprising a load contact network for connecting power source terminals to load terminals, which network includes a first section for enabling said connection of said load terminals to said power source terminals during energization intervals; and a second switching section having two positions and connected between said power source terminals and the first section, which second switching section when in its first position inhibits distribution of electrical energy through the first section from said power source terminals to said load terminals, and when in its second position enables said distribution;

a recycle timer circuit operatively connected to the load contact network for placing the second switching section in its first position during a switching interval; and for placing the second switching section in its second position during an energization interval, wherein the recycle timer circuit is capable of recycling between programmed repetitive energization and switching intervals;

a counter operatively coupled to said power source terminals for counting the duration over which energy is distributed to the load terminals in accordance with a given mode of distribution, which counter is connected to the recycle timer circuit for switching the recycle timer circuit from a said given mode of distribution upon the counter operating for a prescribed period;

whereby a predetermined series of intermittent on and off intervals for distribution of electrical energy to the terminals for a given load during a given mode of distribution is defined by the interconnection between the first section and said load terminals and the durations of said programmed energization and switching intervals for which the recycle timer operates during a said given mode of distribution;

which control system is characterized by the feature that the recycle timer circuit is operable in at least first and second modes of distribution, during at least one of which modes the recycle timer circuit recycles between programmed repetitive energization and switching intervals, the combinations of the durations of said intervals being different for different modes of distribution; which recycle timer circuit includes a switching section for switching the recycle timer circuit between different modes of distribution in response to the counter operating for a said prescribed period.

9. A system according to claim 8, wherein the recycle timer circuit is operable in a plurality of modes of distribution, during at least two of which modes the recycle timer circuit recycles between programmed repetitive energization and switching intervals, the combinations of the durations of said intervals being different for different modes of distribution.

10. A system according to claim 8, characterized by the feature that the counter comprises a memory unit which is capable of remembering the duration over which electrical energy is distributed in accordance with a said first mode of distribution, notwithstanding an interruption in availability of electrical energy at said power source terminals.

11. A system according to claim 8, characterized by the feature that the load contact network provides connections between said power source terminals and a plurality of said load terminals for a plurality of loads;

the first section is a first switching section having a plurality of positions wherein when in each said position the first switching section enables the connection of a discrete combination of said load terminals to said power source terminals, which first switching section is capable of being repetitively switched through a sequence of said positions; and the recycle timer circuit is further operatively connected to the load contact network for sequentially switching the first switching section to a different position during each said switching interval.

12. An electrical energy distribution control system according to claim 8, characterized by the feature that the counter includes a pulse timer circuit operatively coupled to said power source terminals which pulse timer circuit is programmed to deliver current pulses at predetermined periodic intervals; and a stepping switch operatively coupled to the pulse timer circuit to step one position in response to each current pulse delivered by the pulse timer circuit.

13. An electrical energy distribution control system according to claim 12, further characterized by a switch connected to the stepping switch for prescribing a stepping switch position at which the counter causes the recycle timer switching section to operate to change the distribution mode of the recycle timer circuit.

14. A system according to claim 10, characterized by the feature that a said on-interval for each said load includes at least one said energization interval and a said off-interval for each said load includes at least one said energization interval.

References Cited
UNITED STATES PATENTS

| | | | |
|---|---|---|---|
| 3,004,202 | 10/1961 | Simson | 317—139 X |
| 3,309,543 | 3/1967 | Alston et al. | 307—141.4 |
| 3,320,431 | 5/1967 | Bough et al. | 307—38 X |

ROBERT K. SCHAEFER, Primary Examiner

H. J. HOHAUSER, Assistant Examiner

U.S. Cl. X.R.

307—140